United States Patent [19]

Sugahara

[11] Patent Number: 5,404,174
[45] Date of Patent: Apr. 4, 1995

[54] SCENE CHANGE DETECTOR FOR DETECTING A SCENE CHANGE OF A MOVING PICTURE

[75] Inventor: Takayuki Sugahara, Yokosuka, Japan

[73] Assignee: Victor Company of Japan, Ltd., Yokohama, Japan

[21] Appl. No.: 82,695

[22] Filed: Jun. 28, 1993

[30] Foreign Application Priority Data

Jun. 29, 1992 [JP] Japan .................. 4-194976

[51] Int. Cl.6 .......................................... H04N 7/137
[52] U.S. Cl. .................... 348/700; 348/412; 348/415
[58] Field of Search ............ 348/405, 412, 415, 384, 348/700, 390; H04N 7/137

[56] References Cited

U.S. PATENT DOCUMENTS

| | | | |
|---|---|---|---|
| 5,063,608 | 11/1991 | Siegel .................. | 348/405 |
| 5,260,782 | 11/1993 | Hui ..................... | 348/409 |
| 5,267,037 | 11/1993 | Sugiyama ............... | 348/415 |
| 5,289,190 | 2/1994 | Shimoda et al. .......... | 348/384 |
| 5,305,115 | 4/1994 | Takahashi et al. ........ | 348/390 |

OTHER PUBLICATIONS

"D.6.4.3.2 Intra/non-intra coding decision"; ISO/IEC 11172-2; 1993; pp. 96–97.

Primary Examiner—Tommy P. Chin
Assistant Examiner—Richard Lee
Attorney, Agent, or Firm—Lowe, Price, LeBlanc & Becker

[57] ABSTRACT

A scene change detector for detecting a scene change of a moving picture reproduced by a series of frames of pictures, consists of a frame memory for storing a frame of picture from among the frames of pictures one after another, a switch for selectively passing a current frame stored in the frame memory after selectively passing a preceding frame stored in the frame memory, an activity calculating circuit for calculating a second activity of the current frame after calculating a first activity of the preceding frame, a first activity memory for storing the second activity after storing the first activity, a delay circuit for delaying the first second activity until the current frame is stored in the frame memory, a second activity memory for storing the first activity delayed in synchronism with the storage of the second activity in the first activity memory, and a scene change judging circuit for judging a scene change of the moving picture by comparing the both activities. The activity is defined as complexity of a frame of picture, and the scene change occurs in the current frame when the first activity greatly differs from the second activity.

9 Claims, 4 Drawing Sheets

SCENE CHANGE DETECTOR FOR DETECTING A SCENE CHANGE OF A MOVING PICTURE

BACKGROUND OF THE INVENTION

1. Field of the Invention

The present invention relates generally to a scene change detector for automatically detecting a scene change of a moving picture reproduced by a series of frames of pictures, and more particularly to a scene change detector utilized in an interframe predictive coding apparatus in which the moving picture is efficiently encoded.

2. Description of the Related Art

A scene change detector in which a scene change of a moving picture is automatically detected has been utilized in a moving picture signal coding apparatus and an editing apparatus. A moving picture reproduced by decoding a series of frames of picture encoded is changed while time is elapsed, and a scene change of the moving picture occurring in a current frame is defined as a large difference between a preceding frame and the current frame displayed at separated times. Also, activity is generally defined as the complexity of a frame of picture. Specifically, the activity is quantitatively defined as the sum of absolute values of digital picture signals indicating a frame of picture, in this specification. That is, the digital picture signals are filtered to obtain output data according to a prescribed filtering process, and absolute values of the output data are calculated. Therefore, the activity is defined as the sum of the absolute values of the output data.

PREVIOUSLY PROPOSED ART

A conventional scene change detector is described with reference to FIG. 1.

FIG. 1 is a block diagram of a conventional scene change detector.

As shown in FIG. 1, frames of input picture composing a moving picture is transmitted one by one to a frame memory 11 on a one-frame transmission cycle. When a first frame of input picture is stored in the frame memory 11, the first frame of input picture is delayed for a period of the one-frame transmission in a delay circuit 12, and the first frame of input picture is stored in a frame memory 13. At this time, a second frame of input picture succeeding to the first frame of input picture is transmitted and stored in the frame memory 11.

Thereafter, the first frame of input picture stored in the frame memory 13 and the second frame of input picture stored in the frame memory 11 are transferred to an interframe difference calculating circuit 14. In the circuit 14, differential picture data between the first frame and the second frame is calculated, and the differential picture data are stored in an interframe memory provided in the circuit 14. Thereafter, the differential picture data are transferred to an activity calculating circuit 15. In the circuit 15, absolute values of the differential picture data are calculated, and a sum of the absolute values is calculated. The sum calculated denotes an activity defined as complexity of the differential picture data. Thereafter, the activity is transferred to a scene change judging circuit 16. In the circuit 16, it is judged whether or not a scene change of the moving picture occurs in the second frame of input picture. For example, in cases where the activity is equal to or higher than a prescribed value, it is judged that a scene change occurs. Also, in cases where the activity is smaller than the prescribed value, it is judged that no scene change occurs. Thereafter, a judging flag indicating the result of the judgement in the circuit 16 is output.

Thereafter, in cases where the scene change detector shown in FIG. 1 is provided in a coding apparatus, moving signals relating to the moving picture are properly coded while referring the judging flag.

PROBLEMS TO BE SOLVED BY THE INVENTION

However, because an interframe difference denoting the differential picture data is calculated in the conventional scene change detector, two frame memories 11, 13 and the interframe difference calculating circuit 14 are necessarily required.

Also, because the judgement of the occurrence of the scene change is performed for each of the frames or fields arranged in series, a large volume of calculation is required to calculate the activity in the activity calculating circuit 15 although an interframe predictive coding process is performed in the conventional scene change detector to reduce the volume of calculation.

In addition, because the activity is calculated in the circuit 15 for each of the frames or fields arranged in series, a scene change occurring in a part of frame or field cannot be detected. Therefore, the scene change cannot be detected with high accuracy.

SUMMARY OF THE INVENTION

An object of the present invention is to provide, with due consideration to the drawbacks of such a conventional scene change detector, a scene change detector in which simplified circuits are provided and a scene change is detected with high accuracy.

The object is achieved by the provision of a scene change detector for detecting a scene change of a moving picture reproduced by a series of frames of pictures, comprising:

activity calculating means for calculating an activity of each of the frames of pictures, the activity of a frame of picture denoting complexity of the picture, and a first activity of a current frame of picture being calculated after a second activity of a preceding frame of picture is calculated;

first activity storing means for storing the first activity calculated by the activity calculating means;

second activity storing means for storing the second activity calculated by the activity calculating means; and scene change judging means for judging whether or not a scene change of the moving picture occurs in the current frame of picture by comparing the first activity stored in the first activity storing means and the second activity stored in the second activity storing means, the occurrence of the scene change being detected in cases where the first activity greatly differs from the second activity.

In the above configuration, a moving picture is reproduced by a series of frames of pictures. Therefore, complexity of the frames of pictures is gradually changed while time is elapsed. Also, complexity of a current frame of picture highly varies from that of a preceding frame of picture when a scene change of the moving picture occurs in the current frame of picture. To quantitatively define the complexity of a frame of picture, an activity is defined as the complexity of a frame of picture.

To detect a scene change of the moving picture, activities of the frames of pictures are initially calculated by the activity calculating means frame by frame. For example, a first activity of a current frame of picture is calculated after a second activity of a preceding frame of picture is calculated. In cases where a scene change of the moving picture occurs in the current frame of picture, the first activity of the current frame of picture greatly varies from the second activity of the preceding frame of picture.

Thereafter, the first activity is stored in the first activity storing means, and the second activity is stored in the second activity storing means. Thereafter, the first activity and the second activity are transferred to the scene change judging means, and both activities are compared to judge whether or not a scene change of the moving picture occurs in the current frame of picture. In cases where the first activity does not greatly differ from the second activity, the occurrence of the scene change is not detected in the scene change judging means. In contrast, in cases where the first activity greatly differs from the second activity, the occurrence of the scene change is detected in the scene change judging means.

Accordingly, because differential picture between the frames of pictures is not calculated, constitutional elements can be reduced.

Also, the object is achieved by the provision of a scene change detector for detecting a scene change of a moving picture reproduced by a series of frames of pictures, comprising:

picture dividing means for dividing each of the frames of pictures into a plurality of divided pictures, a current frame of picture being divided into a plurality of divided current pictures after a preceding frame of picture is divided into a plurality of divided preceding pictures;

activity calculating means for calculating activities of the divided pictures obtained in the picture dividing means each time a frame of picture is divided in the picture dividing means, the activities of the divided pictures denoting complexity of the divided pictures, and first activities of the divided current pictures being calculated after second activities of the divided preceding pictures is calculated;

first activity storing means for storing the first activities calculated by the activity calculating means;

second activity storing means for storing the second activities calculated by the activity calculating means; and scene change judging means for judging whether or not a scene change of the moving picture occurs in the current frame of picture by comparing the first activities stored in the first activity storing means and the second activities stored in the second activity storing means, the occurrence of the scene change being detected in cases where the first activities greatly differ from the second activities.

In the above configuration, a moving picture is reproduced by a series of frames of pictures. Each of the frames of pictures is divided into a plurality of divided pictures in the picture dividing means. For example, a current frame of picture is divided into a plurality of divided current pictures after a preceding frame of picture is divided into a plurality of divided preceding pictures.

Thereafter, activities of the divided pictures are calculated by the activity calculating means each time a frame of picture is divided in the picture dividing means. For example, first activities of the divided current pictures are calculated after second activities of the divided preceding pictures are calculated. In cases where a scene change of the moving picture occurs in the current frame of picture, the first activities of the divided current pictures greatly vary from the second activities of the divided preceding pictures.

Thereafter, the first activities are stored in the first activity storing means, and the second activities are stored in the second activity storing means. Thereafter, the first activities and the second activities are transferred to the scene change judging means, and the first activities are compared with the second activities to judge whether or not a scene change of the moving picture occurs in the current frame of picture. In cases where the first activities do not greatly differ from the second activities, the occurrence of the scene change is not detected in the scene change judging means. In contrast, in cases where the first activities greatly differ from the second activities, the occurrence of the scene change is detected in the scene change judging means.

Accordingly, because differential picture between the frames of pictures is not calculated, constitutional elements can be reduced.

Also, even though a scene change of the moving picture occurs in a part of the current frame of picture, the scene change can be reliably detected because a part of the first activities greatly differ from a part of the second activities.

Also, the object is achieved by the provision of a scene change detector for detecting a scene change of a moving picture reproduced by a series of frames of pictures in which a plurality of rows each consisting of a P-frame of picture and one or more B-frames of pictures are arranged in series, comprising:

frame storing means for storing a frame of picture one after another from among the frames of pictures;

switching means for switching on to pass a P-frame of picture in cases where the P-frame is stored in the frame storing means and switching off not to pass a B-frame of picture in cases where the B-frame is stored in the frame storing means;

activity calculating means for calculating an activity of each of the P-frames of pictures passing through the switching means, the activity of a P-frame of picture denoting complexity of the picture, and a first activity of a current P-frame of picture being calculated after a second activity of a preceding P-frame of picture is calculated;

first activity storing means for storing the first activity calculated by the activity calculating means;

second activity storing means for storing the second activity calculated by the activity calculating means;

scene change judging means for judging whether or not a scene change of the moving picture occurs in the current P-frame of picture by comparing the first activity stored in the first activity storing means and the second activity stored in the second activity storing means and outputting a judging flag indicating the occurrence of the scene change, the occurrence of the scene change being detected in cases where the first activity greatly differs from the second activity; and interframe predictive coding means for predicting the current P-frame of picture with the preceding P-frame of picture stored in the frame storing means to encode the current P-frame of picture predicted in cases where any judging flag indicating the occurrence of the scene change is not output from the scene change judging means, and encoding the current P-frame of picture without any prediction in cases where the judging flag indicating the occurrence of the scene change is output from the scene change judging means.

In the above configuration, a plurality of rows which each consist of a P-frame of picture and one or more B-frames of pictures are arranged in series to reproduce a moving picture.

A frame of picture among the frames of pictures is initially stored in the frame storing means one after another. Thereafter, the switching means is switched on to pass a P-frame when the P-frame is stored in the frame storing means, and the P-frame is transferred to the activity calculating means. That is, whether or not a scene change of the moving picture occurs in the P-frame is judged, and the occurrence of the scene change in a B-frame is not judged. The reason that the scene change in a B-frame is not judged is as follows. The B-frame is predicted with a P-frame succeeding to the B-frame in the interframe predictive coding means, and the B-frame and the succeeding P-frame are strongly correlated to each other even though a scene change really occurs in the B-frame. Therefore, the B-frame predicted in the interframe predictive coding means is almost the same as the B-frame really inputted in the frame storing means. Accordingly, the judgement of the occurrence of the scene change in the B-frame is not required. In contrast, a current P-frame is not predicted with a succeeding P-frame, but predicted with a preceding P-frame. Therefore, in cases where a scene change of the moving picture really occurs in the current P-frame, the current P-frame predicted in the interframe predictive coding means remarkably differs from the current P-frame really inputted in the frame storing means. Accordingly, the judgement of the occurrence of the scene change in the current P-frame is required, and the current P-frame is required to be independently encoded in the interframe predictive coding means without any prediction when the occurrence of the scene change is detected in the current P-frame.

In the activity calculating means, a first activity of a current P-frame of picture is calculated after a second activity of a preceding P-frame of picture is calculated. In cases where a scene change of the moving picture occurs in the current P-frame of picture, the first activity of the current P-frame of picture greatly varies from the second activity of the preceding P-frame of picture.

Thereafter, the first activity is stored in the first activity storing means, and the second activity is stored in the second activity storing means. Thereafter, the first activity and the second activity are transferred to the scene change judging means, and both activities are compared to judge whether or not a scene change of the moving picture occurs in the current P-frame of picture. In cases where the first activity does not greatly differ from the second activity, the occurrence of the scene change is not detected in the scene change judging means. In contrast, in cases where the first activity greatly differs from the second activity, the occurrence of the scene change is detected in the scene change judging means. When the occurrence of the scene change is detected in the scene change judging means, a judging flag is output to the interframe predictive coding means.

In the interframe predictive coding means, when a current B-frame is stored in the frame storing means, the current B-frame is predicted with both a preceding P-frame and a succeeding P-frame regardless of the existence of the judging flag. In contrast, when a current P-frame is stored in the frame storing means, the current P-frame is processed depending on the existence of the judging flag. That is, in cases where no judging flag is output to the interframe predictive coding means, the current P-frame is predicted with a preceding P-frame and is encoded. In cases where the judging flag is output to the interframe predictive coding means, the current P-frame is independently coded without any prediction.

Accordingly, because differential picture between the frames of pictures is not calculated, constitutional elements can be reduced.

Also, because activity values of P-frames are only calculated and an activity value of any B-frame is not calculated, a volume of calculation for obtaining the activity values in the activity calculating means can be remarkably reduced.

BRIEF DESCRIPTION OF THE DRAWINGS

The objects, features and advantages of the present invention will be apparent from the following description taken in conjunction with the accompanying drawings, in which.

DETAIL DESCRIPTION OF THE PREFERRED EMBODIMENTS

Preferred embodiments of a scene change detector according to the present invention are described with reference to drawings.

Figure 1:
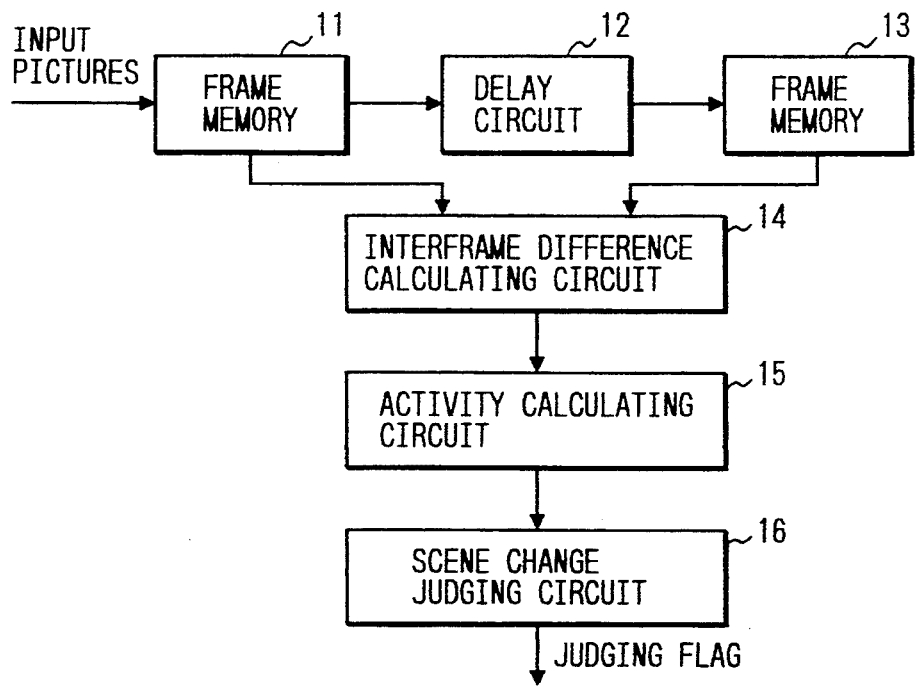
FIG. 1 is a block diagram of a conventional scene change detector.
Figure 2:
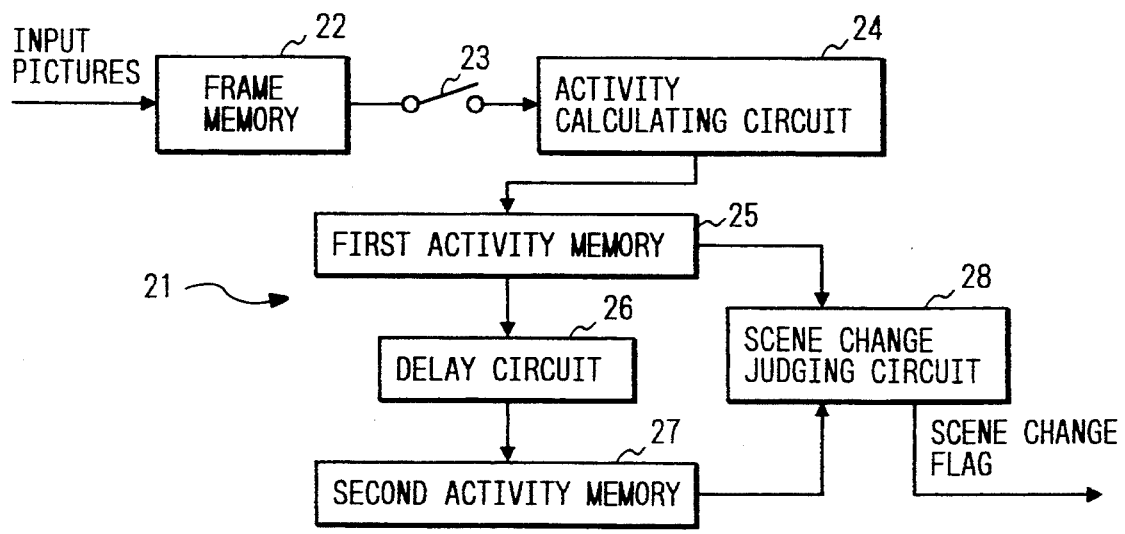
FIG. 2 is a block diagram of a scene change detector according to a first embodiment.

FIG. 2 is a block diagram of a scene change detector according to a first embodiment.

As shown in FIG. 2, a scene change detector 21 comprises a frame memory 22 for storing a frame of input picture one after another from among a series of frames of input pictures reproducing a moving picture on a one-frame transmission cycle, a switch 23 which is switched on when a frame required judging a scene change of the moving picture is stored in the frame memory 22, an activity calculating circuit 24 for calculating an activity value of the input picture transferred from the frame memory 22 through the switch 23, a first activity memory 25 for storing the activity value, a delay circuit 26 for delaying the activity value stored in the first activity memory 25 until the switch 23 is again switched on, a second activity memory 27 for storing the activity value delayed by the delay circuit 26, and a scene change judging circuit 28 for judging whether or not a scene change occurs by comparing the activity value stored in the first activity memory 25 and the activity value stored in the second activity memory 27.

It is preferred that a shift register is substituted for both the first activity memory 25 and the second activity memory 27.

The switch 23 is generally switched on each time a frame of input picture is stored in the frame memory 22, so that the frame of input picture stored in the first activity memory 25 is delayed in the delay circuit 26 for a period of the one-frame transmission in synchronism with the switch-on operation in the switch 23. In contrast, in cases where the scene change detector 21 is utilized in an interframe predictive coding apparatus, as described in a second embodiment in detail, the switch 23 is switched on each time three frames are transferred to the frame memory 22. In this case, the frame stored in the first activity memory 25 is delayed in the delay circuit 26 for a period of three-frame transmission in synchronism with the switch-on operation in the switch 23.

In the above configuration, frames of input pictures reproducing a moving picture are transmitted in series to the frame memory 22 one after another on the one-frame transmission cycle. When a first frame required judging a scene change of the moving picture is stored in the frame memory 22, the switch 23 is switched on so that the first frame stored in the frame memory 22 is transferred to the activity calculating circuit 24 through the switch 23. Thereafter, the switch 23 is switched off until a second frame required judging a scene change of the moving picture is stored in the frame memory 22.

In the activity calculating circuit 24, a first activity value of the first frame transferred from the frame memory 22 through the switch 23 is calculated. In detail, a viewer is sensitive to a moving picture reproduced by picture signals existing in a pass band range from 0.8 MHz to 1.2 MHz, and the pass band range highly influences the amount of codes obtained by coding the digital picture data. Therefore, signals of digital picture data indicating the first frame of input picture are filtered to selectively obtain the signals of the digital picture data existing in the pass band range from 0.8 MHz to 1.2 MHz. In this case, the signals of digital picture data are, for example, equivalent to luminance signals. Thereafter, absolute values of the digital picture data filtered are calculated in an absolute value calculator, and the sum of the absolute values is obtained in an adder. The first activity value defined as the sum of the absolute values denotes the complexity of the first flame of input picture.

Figure 7:
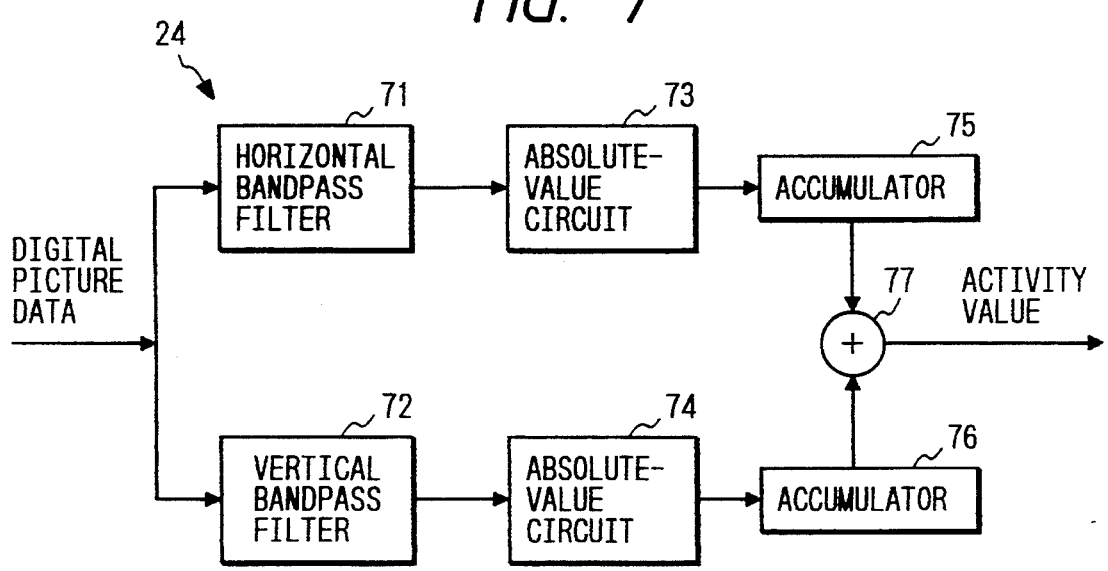
FIG. 7 is a preferable block diagram of an activity calculating circuit utilized for the scene change detectors shown in FIGS. 2, 4, and 5 according to the present invention.

The activity calculating circuit 24 is preferably constructed as shown in FIG. 7, in which horizontal frequency components and vertical frequency components in a band ranging from 0.8 MHz to 1.2 MHz are extracted from the digital picture data by a horizontal bandpass filter 71 and a vertical bandpass filter 72, absolute values of the extracted components are calculated by absolute-value circuits 73, 74, and then the absolute values are summed by accumulators 75, 75 and an adder 77.

Thereafter, the first activity value calculated in the activity calculating circuit 24 is stored in the first activity memory 25. When a second frame required judging a scene change of the moving picture is stored in the frame memory 22, the switch 23 is again switched on. Therefore, the first activity value stored is transferred to the second activity memory 27 in synchronism with the switch-on operation in the switch 23, and the second frame stored in the frame memory 22 is transferred to the activity calculating circuit 24 through the switch 23 to calculate a second activity value of the second frame. The second activity value defined as the sum of absolute values relating to the second frame denotes the complexity of the second flame of input picture. The second activity value is thereafter stored in the first activity memory 25.

Thereafter, the first activity value stored in the second activity memory 27 and the second activity value stored in the first activity memory 25 are transferred to the scene change judging circuit 28. In the circuit 28, whether or not a scene change of the moving picture occurs in the second frame is judged by calculating the degree of difference between the first activity value and the second activity value in a calculator according to a scene change judging equation (1).

$$RC = |ACT1 - ACT2|/(ACT1 + ACT2) \tag{1}$$

Where the symbol RC denotes a judging value, the symbol ACT1 denotes the first activity value, and the symbol ACT2 denotes the second activity value.

In cases where the judging value RC is equal to or larger than a threshold value TH ($RC \geq TH$), it is judged in a judging circuit of the circuit 28 that a scene change occurs in the second frame. In contrast, in cases where the judging value RC is smaller than the threshold value TH ($RC < TH$), it is judged in the judging circuit of the circuit 28 that no scene change occurs in the second frame. The threshold value TH is, for example, equal to 0.05.

Thereafter, a scene change flag indicating the judging result obtained in the circuit 28 is output from the circuit 28. Therefore, the scene change flag reliably informs a peripheral apparatus (not shown) of the scene change in the second frame.

Accordingly, because differential picture data between the first frame and the second frame are not calculated in the scene change detector 21, the frame memory 22 is only required to store a frame, and any interframe difference calculating circuit is not required. Also, the size of each of the activity memories 25, 27 required in the detector 21 is considerably smaller than a frame memory, and the size of the delay circuit 26 is considerably smaller than that of the delay circuit 12. Therefore, the scene change detector 21 can be manufactured in a small size.

In addition, because the occurrence of the scene change is judged by comparing the threshold TH and the judging value RC determined by the first and second activity value ACT1, ACT2, about 95% of the scene changes can be detected in the scene change detector 21.

Figure 3:
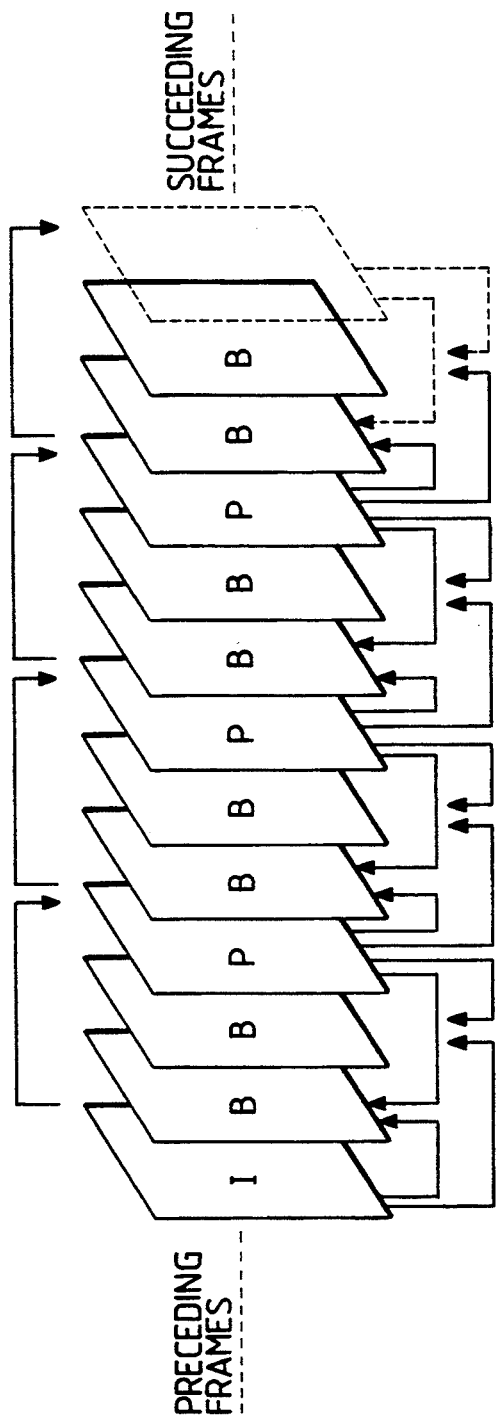
FIG. 3 explanatorily shows a series of frames for illustrating how to predict a current frame according to an interframe predictive coding.
Figure 4:
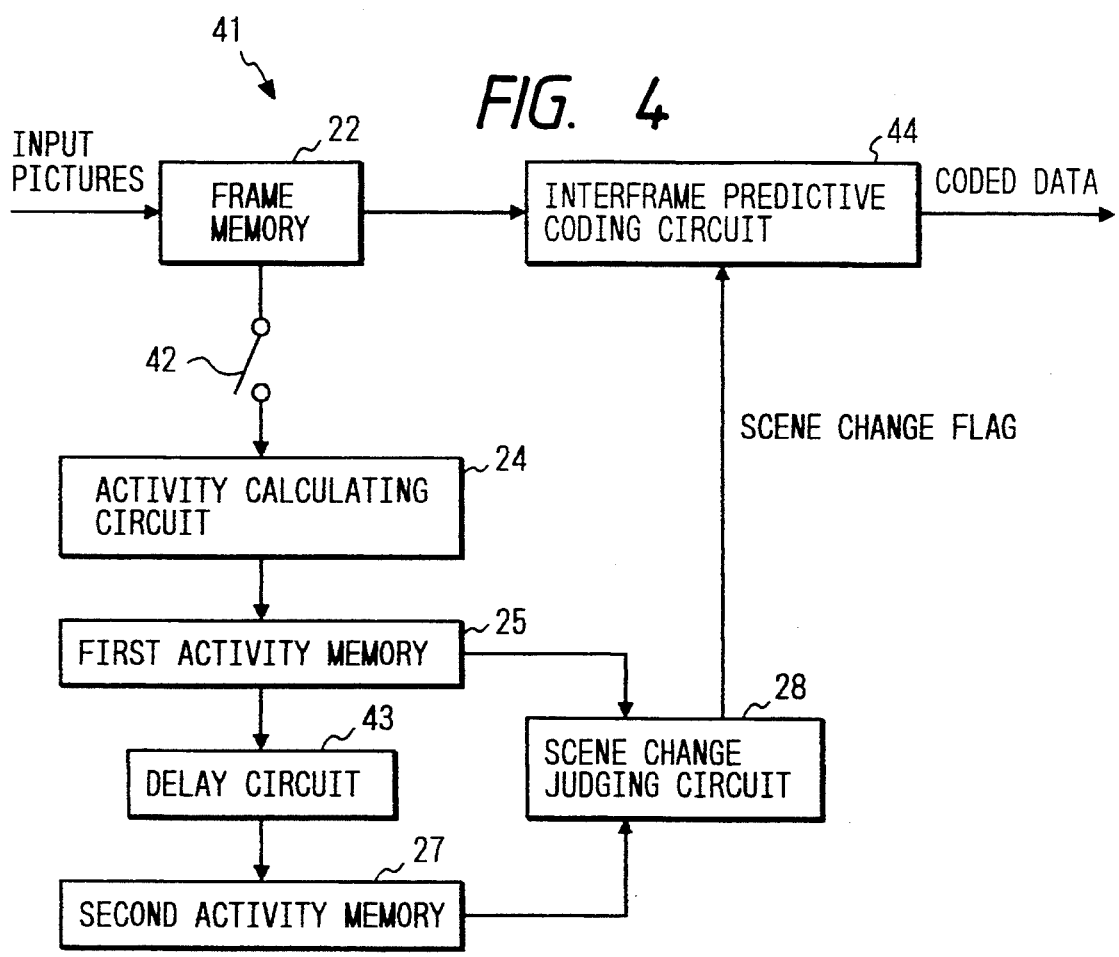
FIG. 4 is a block diagram of a scene change detector according to a second embodiment, the scene change detector being put in an interframe predictive coding apparatus in which the interframe predictive coding is applied.

Next, a scene change detector put in an interframe predictive coding apparatus in which an interframe predictive coding is applied is described according to a second embodiment with reference to FIGS. 3, 4.

In cases where a first frame of picture and a second frame of picture arranged closely to the first frame of picture highly correlate to each other in a series of frames reproducing a moving picture, a small change of the moving picture occurring between the first and second frames often occurs in a limited part of the moving picture. Therefore, in cases where the limited part of the moving picture is selectively encoded in each of frames to produce coded data according to an interframe predictive coding, the amount of coded data is considerably reduced as compared with a case that all parts of the moving picture are independently encoded without any prediction.

FIG. 3 explanatorily shows a series of frames for illustrating how to predict a current frame according to an interframe predictive coding.

As shown in FIG. 3, an I-frame is utilized as a reference frame. That is, the I-frame is not predicted with any frame and is encoded independently. In this case, the amount of codes obtained by actually encoding the I-frame is quite large. A current P-frame is predicted with a preceding frame such as another P-frame or an I-frame, and a prediction error in the current P-frame is calculated. The prediction error is defined as the difference between the current P-frame of picture predicted and the current P-frame of frame actually input. Thereafter, the prediction error is encoded. In this case, the amount of codes obtained by encoding the prediction error are smaller than the amount of codes obtained by encoding the current P-frame independently. A current B-frame is generally predicted with both a preceding P-frame or I-frame and a succeeding P-frame or I-frame which are respectively nearest to the B-frame, and a prediction error in the current B-frame is calculated. Thereafter, the prediction error is encoded. The amount of codes of the B-frame is more reduced as compared with those of the P-frame.

Therefore, the P-frames are predicted at three frame intervals in the case shown in FIG. 3.

FIG. 4 is a block diagram of a scene change detector put in an interframe predictive coding apparatus in which the interframe predictive coding is applied.

As shown in FIG. 4, a scene change detector 41 comprises the frame memory 22, a switch 42 which is switched on when an I-frame or a P-frame is stored in the frame memory 22, the activity calculating circuit 24 for calculating an activity value of the I-frame or P-frame transferred from the frame memory 22 through the switch 42, the first activity memory 25, a delay circuit 43 for delaying the activity value stored in the activity memory 25 for a period of three-frame transmission, the second activity memory 27 for storing the activity value delayed by the delay circuit 43, the scene change judging circuit 28, and an interframe predictive coding circuit 44 for calculating a prediction error of the input picture stored in the frame memory 22 under control of a scene change flag indicating the judging result obtained in the scene change judging circuit 28 according to an interframe predictive coding and coding the prediction error to produce coded data.

In the above configuration, the frames shown in FIG. 3 are transmitted to the frame memory 22 one after another on one-frame transmission cycle $\Delta T$. When a first I-frame or a first P-frame is stored in the frame memory 22 at a first time T1, the switch 42 is switched on so that the first frame stored in the frame memory 22 is transferred to the activity calculating circuit 24 through the switch 42. Thereafter, the switch 42 is switched off until a period $3*\Delta T$ of three-frame transmission passes. In other words, when a B-frame is stored in the frame memory 22, the switch 42 is switched off so that the B-frame is not transferred to the circuit 24.

The reason that the B-frame is not utilized for the judgement of the scene change is as follows. Even though a scene change really occurs in a B-frame, a P-frame or an I-frame succeeding to the B-frame is predicted in the interframe predictive coding circuit 44 prior to the prediction of the B-frame because the B-frame is predicted with the P-frame or the I-frame succeeding to the B-frame. Therefore, the scene change in the P-frame or the I-frame succeeding to the B-frame is required to be judged in the scene change judging circuit 28 in place of the scene change really occurring in the B-frame. In this case, because the B-frame and the P-frame or the I-frame succeeding to the B-frame strongly correlates to each other, the B-frame predicted is almost the same as the B-frame really input. As a result, even though the B-frame is not utilized for the judgement of the scene change in the circuit 28, there is no problem because the B-frame can be predicted with high accuracy.

Also, when the occurrence of a scene change in a P-frame is detected in the scene change judging circuit 28 regardless of whether the scene change really occurs in the P-frame, the P-frame predicted in the circuit 44 remarkably differs from the P-frame really input because the P-frame is predicted with a preceding P-frame or I-frame in which the scene change has not yet occurred, so that the P-frame cannot be reproduced with high accuracy. Therefore, it is required that the P-frame is not predicted with any frame in the circuit 44. In other words, it is required that the P-frame is treated as an I-frame and is encoded independently.

In the activity calculating circuit 24, a first activity value of the input picture in the first frame transferred from the frame memory 22 through the switch 42 is calculated.

Thereafter, the first activity value calculated in the activity calculating circuit 24 is stored in the first activity memory 25. After the first activity value stored is delayed in the delay circuit 43 for a period $3*\Delta T$ of three-frame transmission passes, the first activity value delayed is transferred to the second activity memory 27 at a second time T2 (T2=T1+$3*\Delta T$). At this time, because a second I-frame or a second P-frame is stored in the frame memory 22, the switch 42 is again switched on so that the second frame stored in the frame memory 22 is transferred to the activity calculating circuit 24 through the switch 42 to calculate a second activity value of the input picture in the second frame. The second activity value is thereafter stored in the first activity memory 25.

Thereafter, the first activity value stored in the second activity memory 27 and the second activity value stored in the first activity memory 25 are transferred to the scene change judging circuit 28. In the circuit 28, whether or not a scene change occurs is judged by comparing the first activity value and the second activity value according to the scene change judging equation (1).

In cases where the judging value RC is equal to or larger than a threshold value TH (RC$\geq$TH), it is judged in the circuit 28 that a scene change occurs in the second frame. In contrast, in cases where the judging value RC is smaller than the threshold value TH (RC<TH), it is judged in the circuit 28 that no scene change occurs in the second frame.

Thereafter, a scene change flag indicating the judging result obtained in the circuit 28 is output from the circuit 28 to the interframe predictive coding circuit 44. In the circuit 44, the second frame stored in the frame memory 22 is predicted according to an interframe predictive coding under control of the scene change flag. In detail, in cases where an I-frame is transferred from the frame memory 22 to the circuit 44, the I-frame is not predicted with any frame and is encoded independently to produce coded data in the same manner as a conventional method regardless of the judging result indicated by the scene change flag. In cases where a B-frame is transferred from the frame memory 22 to the circuit 44, no scene change flag is transferred from the flame memory 22 to the circuit 44. Therefore, a prediction error of the B-frame is calculated in the same manner as a conventional method, and the prediction error is encoded to produce coded data.

In contrast, in cases where a P-frame is transferred from the frame memory 22 to the circuit 44, the P-frame is processed in the circuit 44 under control of the scene change flag. That is, when the scene change flag indicates that the scene change is judged in the circuit 28, a current scene displayed on the P-frame greatly differs from a preceding scene displayed on a preceding I-frame or a preceding P-frame. Therefore, the P-frame predicted according to the interframe predictive coding remarkably differs from the P-frame really input. Accordingly, the P-frame transferred from the frame memory 22 is treated as an I-frame. That is, the P-frame is not predicted with any frame and is encoded independently to produce coded data.

Thereafter, the coded data produced in the circuit 44 are output to an external device (not shown) such as a recording medium through a transmission line (not shown). Thereafter, the coded data are decoded in a decoder (not shown) to reproduce the moving picture.

Accordingly, because differential picture data between the first frame of input picture and the second frame of input picture is not calculated in the scene change detector 21, the frame memory 22 is only required to store a frame, and any interframe difference calculating circuit is not required. Also, the size of each of the activity memories 25, 27 required in the detector 21 is considerably smaller than a frame memory, and the size of the delay circuit 43 is considerably smaller than that of the delay circuit 12. Therefore, the scene change detector 21 can be manufactured in a small size.

Also, because activity values of P-frames and I-frames are only calculated and an activity value of any B-frame is not calculated, a volume of calculation for obtaining the activity values in the activity calculating circuit 24 can be remarkably reduced.

Next, a scene change detector according to a third embodiment is described with reference to FIGS. 5, 6.

Figure 5:
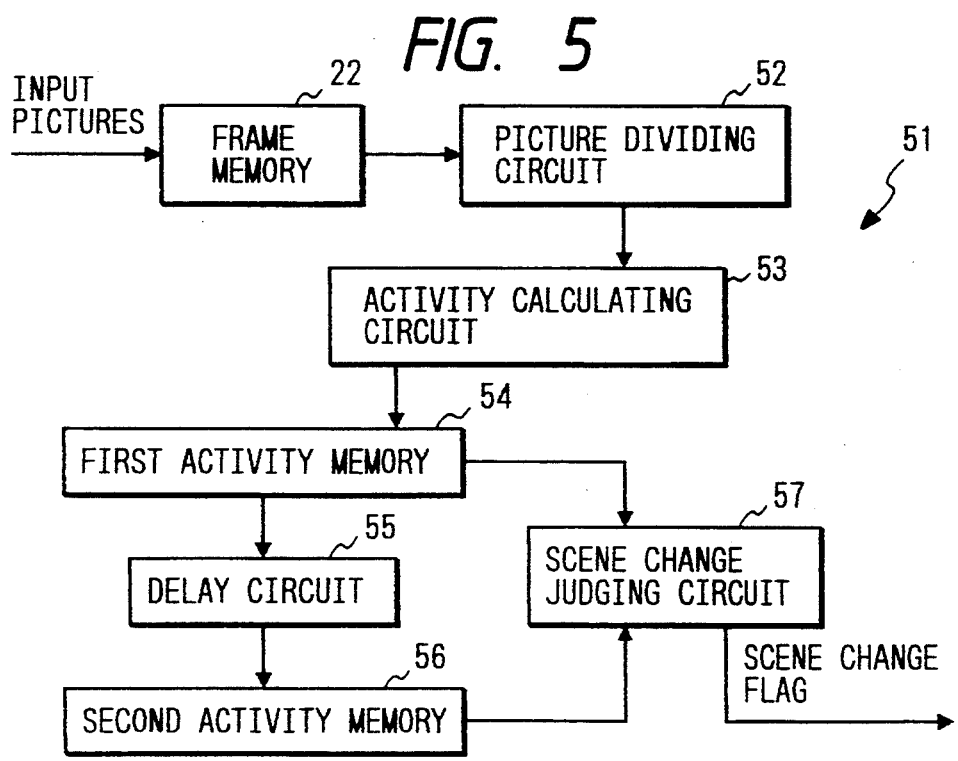
FIG. 5 is a block diagram of a scene change detector according to a third embodiment.
Figure 6:
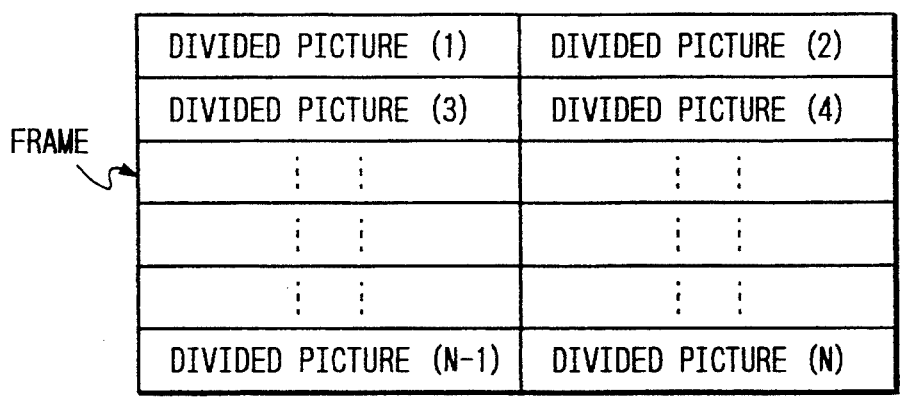
FIG. 6 shows N divided pictures obtained by dividing a frame of input picture into N pieces.

FIG. 5 is a block diagram of a scene change detector according to a third embodiment.

As shown in FIG. 5, a scene change detector 51 comprises the frame memory 22, a picture dividing circuit 52 for dividing the frame of input picture stored in the frame memory 22 into N divided pictures DP(n) (n=1, 2, ... N), an activity calculating circuit 53 for calculating activity values of the divided pictures DP(n), a first activity memory 54 for storing the activity values calculated, a delay circuit 55 for delaying the activity values stored in the first activity memory 54 for a period of one-frame transmission, a second activity memory 56 for storing the activity values delayed by the delay circuit 55, and a scene change judging circuit 57 for judging whether or not a scene change occurs in each of the divided pictures DP(n) by comparing each of the activity values stored in the first activity memory 54 and each of the activity values stored in the second activity memory 56.

It is preferred that a shift register is substituted for both the first activity memory 54 and the second activity memory 56.

In the above configuration, frames are transmitted in series to the frame memory 22 on one-frame transmission cycle. When a first frame is stored in the frame memory 22, the first frame stored is transferred to the picture dividing circuit 52. In the circuit 52, the first frame of input picture is divided into N divided pictures DP1(n) as shown in FIG. 6. Thereafter, the N divided pictures are processed in parallel to each other in the circuits 53, 55, 57 and the memories 54, 56.

The N divided pictures are transferred to the activity calculating circuit 53. In the circuit 53, first activity values ACT1(n) of the divided pictures DP1(n) are calculated. In detail, divided digital picture data denoting each of the divided pictures are filtered in a pass band range from 0.8 MHz to 1.2 MHz. Thereafter, absolute values of the divided digital picture data filtered are calculated, and the sum of the absolute values is obtained. The sum of the absolute values denotes the complexity of each of the divided pictures displayed on the first frame, so that each first activity value is defined as the sum of the absolute values.

Thereafter, the first activity values ACT1(n) calculated in the activity calculating circuit 53 are stored in the first activity memory 54. After a period of one-frame transmission passes, a second frame succeeding to the first frame is stored in the frame memory 22, and the first activity values stored in the circuit 54 are transferred to the second activity memory 56. The second frame of input picture is divided into N divided pictures DP2(n) in the circuit 52, and second activity values ACT2(n) of the divided pictures DP2(n) are calculated in the circuit 53. Thereafter, the second activity values are stored in the first activity memory 54.

Thereafter, the first activity values stored in the second activity memory 56 and the second activity values stored in the first activity memory 54 are transferred to the scene change judging circuit 57. In the circuit 57, whether or not a scene change occurs is judged by comparing each of the first activity values ACT1(n) and each of the second activity values ACT2(n) according to a scene change judging equation (2).

$$RC(n) = |ACT1(n) - ACT2(n)| / (ACT1(n) + ACT2(n)) \qquad (2)$$

Where the symbol RC(n) denotes each of judging values.

In cases where a judging value RC(i) ($1 \leq i \leq N$) is equal to or larger than a threshold value TH (RC$\geq$TH), it is judged in the circuit 57 that a scene change occurs in the divided picture DP(i) of the second frame. In contrast, in cases where the judging value RC(i) is smaller than the threshold value TH (RC<TH), it is judged in the circuit 57 that no scene change occurs in the divided picture DP(i) of the second frame.

Therefore, N judgements are obtained. In cases where the ratio of the number of judging values RC(n) equal to or larger than the threshold value TH to the number N of all judging values RC(n) is over a predetermined value, it is judged in the circuit 57 that a scene change really occurs in the second frame.

Thereafter, a scene change flag indicating the judging result obtained in the circuit 57 is output from the circuit 57. Therefore, the scene change flag reliably informs a periphery apparatus of the occurrence of the scene change.

Accordingly, because differential picture data between the first frame of input picture and the second frame of input picture is not calculated in the scene change detector 51, the frame memory 22 is only required to store a frame, and any interframe difference calculating circuit is not required. Also, the size of each of the activity memories 54, 56 required in the detector 51 is considerably smaller than a frame memory, and the size of the delay circuit 55 is considerably smaller than that of the delay circuit 12. Therefore, the scene change detector 51 can be manufactured in a small size.

Also, because the scene change is judged in each of the divided pictures DP(n) of a frame, even though a scene change really occurs in a part of the frame, the occurrence of the scene change can be reliably detected. Therefore, substantially 100% of the scene changes can be detected in the scene change detector 51.

It is preferred that the scene change detector 51 be utilized in an interframe predictive coding apparatus in which the interframe predictive coding is applied.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A scene change detector for detecting a scene change of a moving picture reproduced by a series of frames of pictures, comprising:

activity calculating means for calculating an activity of each of the frames of pictures, the activity of a frame of picture denoting a sum of absolute values of digital picture signals which indicate the picture, and a second activity ACT2 of a current frame of picture being calculated after a first activity ACT1 of a preceding frame of picture is calculated;

first activity storing means for storing the second activity ACT2 calculated by the activity calculating means;

second activity storing means for storing the first activity ACT1 calculated by the activity calculating means; and scene change judging means for judging whether or not a scene change of the moving picture occurs in the current frame of picture by comparing the second activity ACT2 stored in the first activity storing means and the first activity ACT1 stored in the second activity storing means, the occurrence of the scene change being detected in cases where the first activity ACT1 greatly differs from the second activity ACT2.

2. A detector according to claim 1 in which the activity calculating means includes:

bandpass filter means for extracting frequency components in a predetermined band from digital picture data composing each of the frames of pictures;

absolute value calculating means for calculating absolute values of the frequency components extracted by the bandpass filter means; and accumulating means for accumulating the absolute values calculated by the absolute value calculating means to obtain a summed value denoting the activity of each of the frames of pictures.

3. A detector according to claim 2 in which the scene change judging means includes:

a calculator for calculating a degree of difference between the first activity ACT1 and the second activity ACT2 according to a scene change judging equation (1), $$RC = |ACT1 - ACT2| / (ACT1 + ACT2) \quad (1)$$

where the symbol RC denotes a judging value indicating the degree of the difference; and a judging circuit for judging that a scene change of the moving picture occurs in the current frame of picture in cases where the judging value RC is equal to or larger than a threshold value.

4. A scene change detector for detecting a scene change of a moving picture reproduced by a series of frames of pictures, comprising:

picture dividing means for dividing each of the frames of pictures into a plurality of divided pictures, a current frame of picture being divided into a plurality of divided current pictures after a preceding frame of picture is divided into a plurality of divided preceding pictures;

activity calculating means for calculating activities of the divided pictures obtained in the picture dividing means each time a frame of picture is divided in the picture dividing means, an activity of a divided picture denoting a sum of absolute values of digital picture signals which indicate the divided picture, and second activities ACT2(n) (n is a natural number) of the divided current pictures being calculated after first activities ACT1(n) of the divided preceding pictures are calculated;

first activity storing means for storing the second activities ACT2(n) calculated by the activity calculating means;

second activity storing means for storing the first activities ACT1(n) calculated by the activity calculating means; and scene change judging means for judging whether or not a scene change of the moving picture occurs in the current frame of picture by comparing the second activities ACT2(n) stored in the first activity storing means and the first activities ACT1(n) stored in the second activity storing means, the occurrence of the scene change being detected in cases where the first activities ACT1(n) greatly differ from the second activities ACT2(n).

5. A detector according to claim 4 in which the activity calculating means includes:

bandpass filter means for extracting frequency components in a predetermined band from digital picture data composing each of the divided pictures;

absolute value calculating means for calculating absolute values of the frequency components extracted by the bandpass filter means; and accumulating means for accumulating the absolute values calculated by the absolute value calculating means to obtain a summed value denoting the activity of each of the divided pictures.

6. A detector according to claim 5 in which the scene change judging means includes:
- a calculator for calculating degrees of differences between each of the first activities ACT1(n) and each of the second activities ACT2(n) according to a scene change judging equation (1), $$RC(n) = |ACT1(n) - ACT2(n)| / (ACT1(n) + ACT2(n)) \qquad (1)$$

where the symbol RC(n) denotes judging values indicating the degrees of the differences; and
- a judging circuit for judging that a scene change of the moving picture occurs in the current frame of picture in cases where a ratio of the number of judging values RC(n) equal to or larger than a threshold value to the number of judging values RC(n) is greater than a predetermined value.

7. A scene change detector for detecting a scene change of a moving picture reproduced by a series of frames of pictures in which a plurality of rows each consisting of an I-frame or P-frame of picture and one or more B-frames of pictures are arranged in series, comprising:
- frame storing means for storing a frame of picture one after another from among the frames of pictures;
- switching means for switching on to pass an I-frame or P-frame of picture in cases where the I-frame or P-frame is stored in the frame storing means and switching off not to pass a B-frame of picture in cases where the B-frame is stored in the frame storing means;
- activity calculating means for calculating an activity of each of the I-frames and P-frames of pictures passing through the switching means, the activity of an I-frame or P-frame of picture denoting a sum of absolute values of digital picture signals which indicate the picture, and a second activity ACT2 of a current P-frame of picture being calculated after a first activity ACT1 of a preceding I-frame or P-frame of picture is calculated;
- first activity storing means for storing the second activity ACT2 calculated by the activity calculating means;
- second activity storing means for storing the first activity ACT1 calculated by the activity calculating means;
- scene change judging means for judging whether or not a scene change of the moving picture occurs in the current P-frame of picture by comparing the first activity ACT1 stored in the second activity storing means and the second activity ACT2 stored in the first activity storing means and outputting a judging flag indicating the occurrence of the scene change, the occurrence of the scene change being detected in cases where the first activity ACT1 greatly differs from the second activity ACT2; and
- interframe predictive coding means for predicting the current I-frame or P-frame of picture with the preceding P-frame of picture stored in the frame storing means to encode the current P-frame of picture predicted in cases where the judging flag indicating the occurrence of the scene change is not output from the scene change judging means, and encoding the current P-frame of picture without any prediction in cases where the judging flag indicating the occurrence of the scene change is output from the scene change judging means.

8. A detector according to claim 7 in which the activity calculating means includes:
- bandpass filter means for extracting frequency components in a predetermined band from digital picture data composing each of the I-frames and P-frames of pictures;
- absolute value calculating means for calculating absolute values of the frequency components extracted by the bandpass filter means; and
- accumulating means for accumulating the absolute values calculated by the absolute value calculating means to obtain a summed value denoting the activity of each of the I-frames and P-frames of pictures.

9. A detector according to claim 8 in which the scene change judging means includes:
- a calculator for calculating a degree of difference between the first activity ACT1 and the second activity ACT2 according to a scene change judging equation (1), $$RC = |ACT1 - ACT2| / (ACT1 + ACT2) \qquad (1)$$

where the symbol RC denotes a judging value indicating the degree of the difference; and
- a judging circuit for judging that a scene change of the moving picture occurs in the current P-frame of picture in cases where the judging value RC is equal to or larger than a threshold value.

* * * * *